(12) United States Patent
Lin et al.

(10) Patent No.: US 10,747,271 B2
(45) Date of Patent: Aug. 18, 2020

(54) DUAL-SHAFT HINGE AND ELECTRONIC DEVICE

(71) Applicants: Che-Hsien Lin, Taipei (TW);
Che-Hsien Chu, Taipei (TW)

(72) Inventors: Che-Hsien Lin, Taipei (TW);
Che-Hsien Chu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/177,456

(22) Filed: Nov. 1, 2018

(65) Prior Publication Data

US 2019/0138061 A1 May 9, 2019

Related U.S. Application Data

(60) Provisional application No. 62/581,047, filed on Nov. 3, 2017.

(51) Int. Cl.
*E05D 3/06* (2006.01)
*G06F 1/16* (2006.01)
*E05D 3/12* (2006.01)

(52) U.S. Cl.
CPC ............. *G06F 1/1681* (2013.01); *E05D 3/12* (2013.01); *E05D 3/122* (2013.01); *E05Y 2900/606* (2013.01)

(58) Field of Classification Search
CPC .... E05D 3/12; E05D 3/06; E05D 3/10; G06F 1/1681; G06F 1/1616; G06F 1/1618;
(Continued)

(56) References Cited

U.S. PATENT DOCUMENTS 8,776,319 B1 * 7/2014 Chang ................. G06F 1/1681
16/303
8,914,946 B2 * 12/2014 Hsu ......................... F16H 21/44
16/342
(Continued)

FOREIGN PATENT DOCUMENTS

TW    M430139      5/2012
TW    M513385     12/2015

*Primary Examiner* — Chuck Y Mah
(74) *Attorney, Agent, or Firm* — JCIPRNET

(57) ABSTRACT

A dual-shaft hinge and an electronic device are provided. The dual-shaft hinge includes a first rotating shaft, a second rotating shaft, a fixing assembly, a torque element, and a first carrier plate. The fixing assembly has first via, second via, and a first locating hole. The first rotating shaft is inserted in the first via, and the second rotating shaft is inserted in the second via. The torque element has a connection portion, a first torque providing portion and a second torque providing portion extending from two opposite sides of the connection portion, and a first positioning protruding portion and a second positioning protruding portion extending from the other two opposite sides of the connection portion. The first rotating shaft is inserted in a first hole groove, and the second rotating shaft is inserted in a second hole groove. The first positioning protruding portion is inserted in the first locating hole. The first carrier plate has a first through hole, a second through hole, and a second locating hole. The first rotating shaft is inserted in the first through hole, the second rotating shaft is inserted in the second through hole, and the second positioning protruding portion is inserted in the second locating hole.

20 Claims, 9 Drawing Sheets

(58) Field of Classification Search
CPC .......... E05Y 2900/606; H04M 1/0216; H04M 1/0222; H04M 1/022; F16C 11/04; F16C 11/10; F16C 11/12; Y10T 16/54038; Y10T 16/5403; Y10T 16/54033; Y10T 16/547; Y10T 16/5474; Y10T 16/5475
See application file for complete search history.

(56) References Cited

U.S. PATENT DOCUMENTS

| | | | | |
|---|---|---|---|---|
| 9,003,606 | B2* | 4/2015 | Hsu | G06F 1/1681 16/366 |
| 9,104,381 | B2* | 8/2015 | Kuramochi | G06F 1/1681 |
| 9,752,360 | B2* | 9/2017 | Chuang | E05D 3/06 |
| 9,778,704 | B2* | 10/2017 | Motosugi | G06F 1/1681 |
| 2013/0111704 | A1* | 5/2013 | Mitsui | H04M 1/022 16/250 |
| 2013/0135809 | A1* | 5/2013 | Uchiyama | G06F 1/1681 361/679.09 |
| 2014/0223693 | A1* | 8/2014 | Hsu | G06F 1/1681 16/282 |
| 2014/0268533 | A1* | 9/2014 | Meyers | G06F 1/1681 361/679.27 |
| 2015/0040353 | A1* | 2/2015 | Chen | G06F 1/1681 16/366 |
| 2015/0173218 | A1* | 6/2015 | Hsu | E05D 3/12 16/366 |
| 2015/0189777 | A1* | 7/2015 | Hsu | H05K 5/0226 16/366 |

* cited by examiner

DUAL-SHAFT HINGE AND ELECTRONIC DEVICE

CROSS-REFERENCE TO RELATED APPLICATION

This application claims the priority benefit of U.S. provisional application Ser. No. 62/581,047, filed on Nov. 3, 2017. The entirety of the above-mentioned patent application is hereby incorporated by reference herein and made a part of this specification.

BACKGROUND

Technical Field

The invention relates to an electronic device. More particularly, the invention relates to an electronic device having a dual-shaft hinge.

Description of Related Art

With rapid development of technology, an increasing number of portable electronic devices such as notebook computers have hit the market. Users may process, send and receive data anytime, anywhere through these portable electronic devices, which have become indispensable items for modern people in their lives.

Taking a notebook computer as an example, a hinge is required to be disposed between the screen upper cover and the main body, so as to allow the screen upper cover and the main body to be unfolded and folded relative to each other. At present, most of the hinges in the electronic devices are designed to be single-shaft hinges, as such, the upper covers may not be able to rotate by 360 degrees with respect to the main bodies.

SUMMARY

The invention provides a dual-shaft hinge that provides a rotational angle of 0 degree to 360 degrees.

The invention further provides an electronic device including the dual-shaft hinge capable of allowing an upper cover to rotate by up to 360 degrees with respect to a main body in the electronic device.

A dual-shaft hinge provided by an embodiment of the invention includes a first rotating shaft, a second rotating shaft, a fixing assembly, a torque element, and a first carrier plate. The fixing assembly includes a first via, a second via, and a first locating hole located between the first via and the second via. The first rotating shaft is inserted in the first via, and the second rotating shaft is inserted in the second via. The torque element has a connection portion, a first torque providing portion and a second torque providing portion extending from two opposite sides of the connection portion, and a first positioning protruding portion and a second positioning protruding portion extending from the other two opposite sides of the connection portion. The first torque providing portion has a first hole groove, and the first rotating shaft is inserted in the first hole groove. The second torque providing portion has a second hole groove, and the second rotating shaft is inserted in the second hole groove. The first positioning protruding portion is inserted in the first locating hole. The first carrier plate and the fixing assembly are located at two opposite sides of the torque element. The first carrier plate has a first through hole, a second through hole, and a second locating hole. The first rotating shaft is inserted in the first through hole, and the second rotating shaft is inserted in the second through hole. The second positioning protruding portion is inserted in the second locating hole.

In an embodiment of the invention, a length of a first bottom end connected to the connection portion is greater than a length of a first top end away from the connection portion in the first positioning protruding portion, and a length of a second bottom end connected to the connection portion is greater than a length of a second top end away from the connection portion in the second positioning protruding portion.

In an embodiment of the invention, the first top end of the first positioning protruding portion away from the connection portion and the second top end of the second positioning protruding portion away from the connection portion both have arc lead angles.

In an embodiment of the invention, the first positioning protruding portion and the second positioning protruding portion are trapezoidal-shaped cylinder structures.

In an embodiment of the invention, a hole length of the first locating hole is less than the length of the first bottom end and is greater than the length of the first top end of the first positioning protruding portion, and a hole length of the second locating hole is less than the length of the second bottom end and is greater than the length of the second top end of the second positioning protruding portion.

In an embodiment of the invention, a minimum distance between the first through hole and the first locating hole on the first carrier plate is 1 to 3 times greater than a thickness of the first carrier plate, and a minimum distance between the second through hole and the first locating hole is 1 to 3 times greater than the thickness of the first carrier plate.

In an embodiment of the invention, portions of the first locating hole and the second locating hole away from the torque element gradually expand.

In an embodiment of the invention, the fixing assembly includes a fixing base and a second carrier plate. The fixing base and the torque element are located at two opposite sides of the second carrier plate. The first via and the second via are formed on both the fixing base and the second carrier plate. The first locating hole is formed on the second carrier plate.

In an embodiment of the invention, the first rotating shaft includes a first stopping surface, and the second rotating shaft includes a second stopping surface. The fixing base includes a first stopping portion and a second stopping portion respectively corresponding to the first stopping surface and the second stopping surface.

In an embodiment of the invention, the dual-shaft hinge further includes a fixing plate, a housing, and a screwing member. The torque element and the fixing plate are located at two opposite sides of the first carrier plate. The fixing plate has a third via, a fourth via, and a screwing hole. The first rotating shaft inserted in the third via, and the second rotating shaft inserted in the fourth via. The housing covers the first rotating shaft, the second rotating shaft, the fixing assembly, the torque element, the first carrier plate, and the fixing plate. The screwing member is inserted in the housing and is screwed to the screwing hole of the fixing plate.

In an embodiment of the invention, the first torque providing portion and the second torque providing portion act as a first sleeve and a second sleeve extending from two opposite sides of the connection portion. The first sleeve surrounds and forms the first hole groove, and the second sleeve surrounds and forms the second hole groove.

An electronic device provided by an embodiment of the invention includes an upper cover, a main body, and a dual-shaft hinge, and the dual-shaft hinge is pivotedly connected to the upper cover and the main body of the electronic device. The dual-shaft hinge includes a first rotating shaft, a second rotating shaft, a fixing assembly, a torque element, and a first carrier plate. The fixing assembly includes first via, second via, and a first locating hole located between one of the first via and one of the second via. The first rotating shaft is inserted in the first via, and the second rotating shaft is inserted in the second via. The torque element has a connection portion, a first torque providing portion and a second torque providing portion extending from two opposite sides of the connection portion, and a first positioning protruding portion and a second positioning protruding portion extending from the other two opposite sides of the connection portion. The first torque providing portion surrounds a first hole groove, and the first rotating shaft is inserted in the first hole groove. The second torque providing portion surrounds a second hole groove, and the second rotating shaft is inserted in the second hole groove. The first positioning protruding portion is inserted in the first locating hole. The first carrier plate and the fixing assembly are located at two opposite sides of the torque element. The first carrier plate has a first through hole, a second through hole, and a second locating hole. The first rotating shaft is inserted in the first through hole, and the second rotating shaft is inserted in the second through hole. The second positioning protruding portion is inserted in the second locating hole.

In the electronic device provided by an embodiment of the invention, a length of a first bottom end connected to the connection portion is greater than a length of a first top end away from the connection portion in the first positioning protruding portion, and a length of a second bottom end connected to the connection portion is greater than a length of a second top end away from the connection portion in the second positioning protruding portion.

In the electronic device provided by an embodiment of the invention, the first top end of the first positioning protruding portion and the second top end of the second positioning protruding portion both have arc lead angles.

In the electronic device provided by an embodiment of the invention, the first positioning protruding portion and the second positioning protruding portion are trapezoidal-shaped cylinder structures.

In the electronic device provided by an embodiment of the invention, a hole length of the first locating hole is less than the length of the first bottom end and is greater than the length of the first top end of the first positioning protruding portion, and a hole length of the second locating hole is less than the length of the second bottom end and is greater than the length of the second top end of the second positioning protruding portion.

In the electronic device provided by an embodiment of the invention, a minimum distance between the first through hole and the second locating hole on the first carrier plate is 1 to 3 times greater than a thickness of the first carrier plate, and a minimum distance between the second through hole and the second locating hole is 1 to 3 times greater than the thickness of the first carrier plate.

In the electronic device provided by an embodiment of the invention, portions of the first locating hole and the second locating hole away from the torque element gradually expand.

In the electronic device provided by an embodiment of the invention, the fixing assembly includes a fixing base and a second carrier plate. The fixing base and the torque element are located at two opposite sides of the second carrier plate. The first via and the second via are formed on both the fixing base and the second carrier plate. The first locating hole is formed on the second carrier plate.

In the electronic device provided by an embodiment of the invention, the first rotating shaft includes a first stopping surface, and the second rotating shaft includes a second stopping surface. The fixing base includes a first stopping portion and a second stopping portion respectively corresponding to the first stopping surface and the second stopping surface.

In the electronic device provided by an embodiment of the invention, the dual-shaft hinge further includes a fixing plate, a housing, and a screwing member. The torque element and the fixing plate are located at two opposite sides of the first carrier plate. The fixing plate has a third via, a fourth via, and a screwing hole. The first rotating shaft is inserted in the third via, and the second rotating shaft is inserted in the fourth via. The housing covers houses the first rotating shaft, the second rotating shaft, the fixing assembly, the torque element, the first carrier plate, and the fixing plate. The screwing member is inserted in the housing and is screwed to the screwing hole of the fixing plate.

To sum up, in the dual-shaft hinge of the electronic device provided by the invention, the cover may rotate with respect to the main body at any angle from 0 degree to 360 degrees. In addition, the first positioning protruding portion of the torque element is designed to be inserted in the first locating hole of the fixing assembly, and the second positioning protruding portion is designed to be inserted in the second locating hole of the first carrier plate. Through the foregoing design, when the upper cover and the main body rotate with respect to each other through the dual-shaft hinge, the first positioning protruding portion and the second positioning protruding portion located between the first torque providing portion and the second torque providing portion of the torque element are fixed by the fixing assembly and the first carrier plate. In this way, in the torque element, the torque force generated by the first torque providing portion and applied to the first rotating shaft and the torque force generated by the second torque providing portion and applied to the second rotating shaft are less susceptible to be affected by each other.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
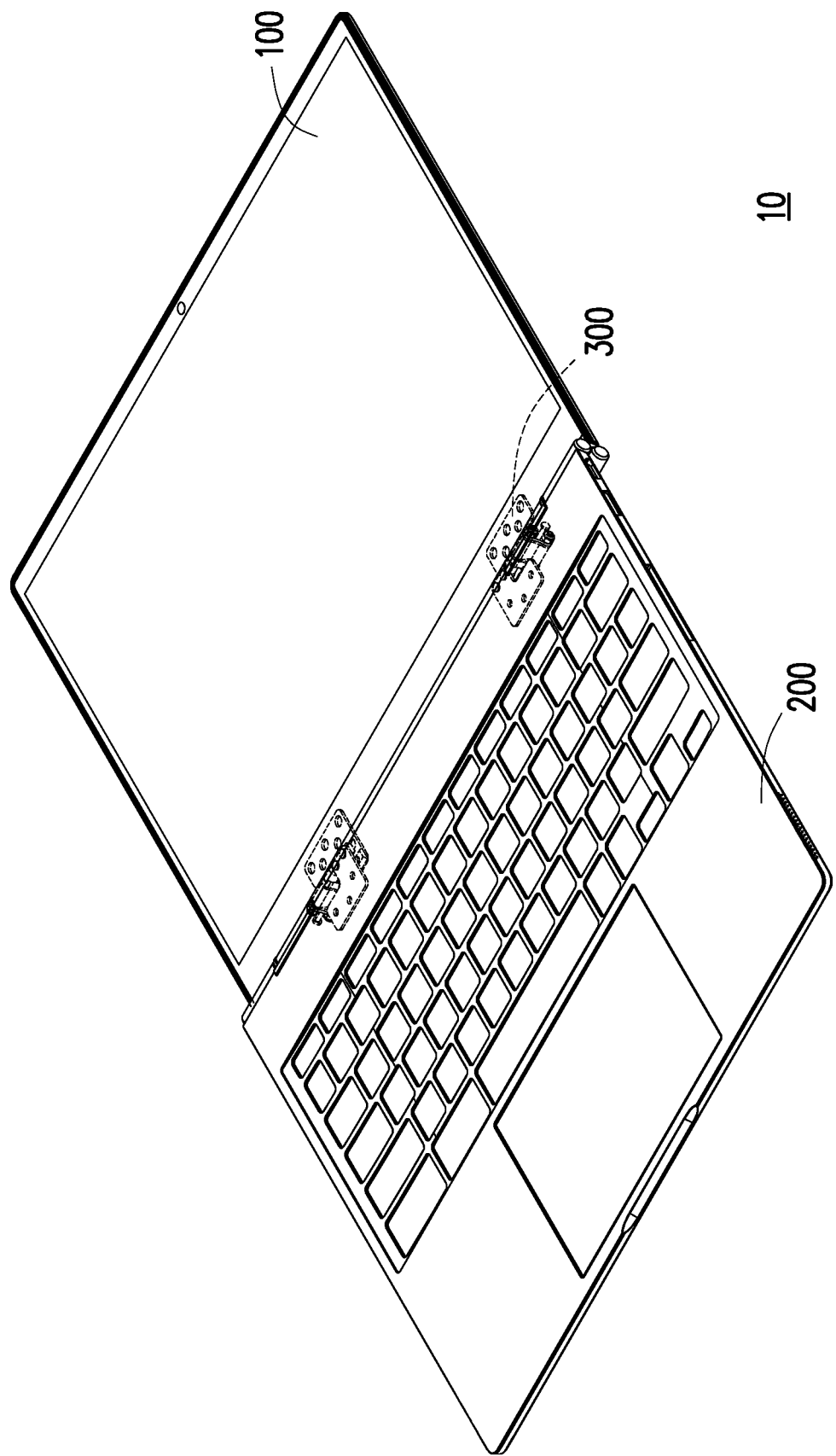
FIG. 1 is a schematic view of a portable electronic device having a dual-shaft hinge according to a first embodiment of the invention.
Figure 2:
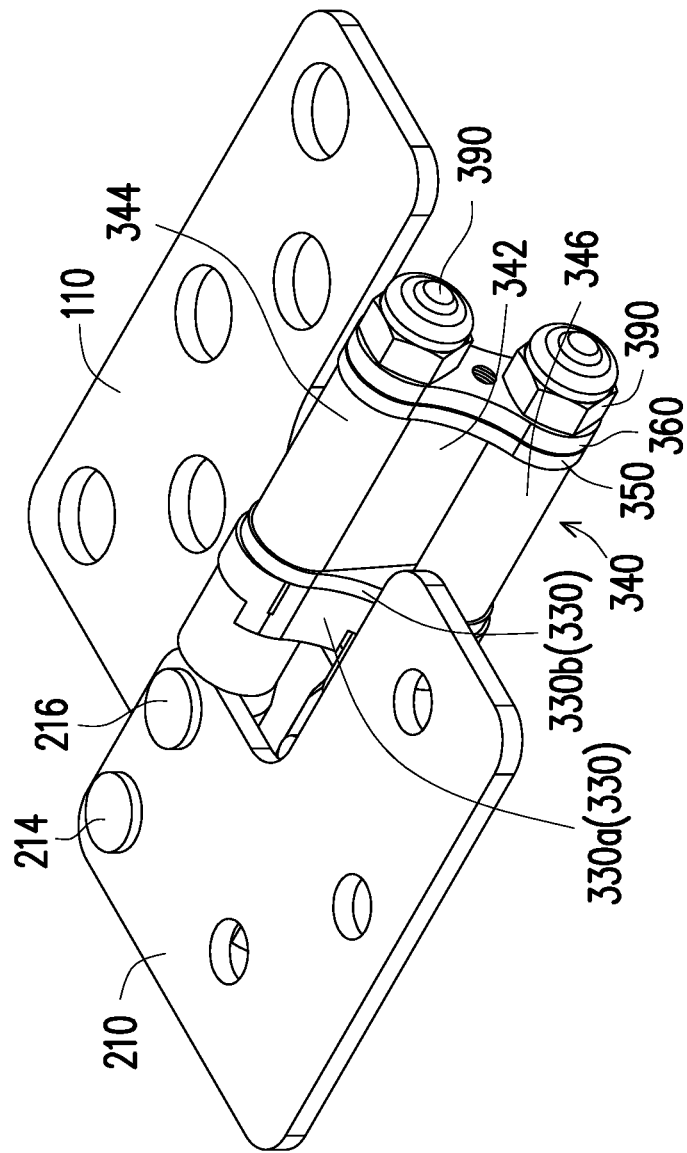
FIG. 2 is a schematic enlarged view of the dual-shaft hinge (excluding a housing and a screwing member).
Figure 3A:
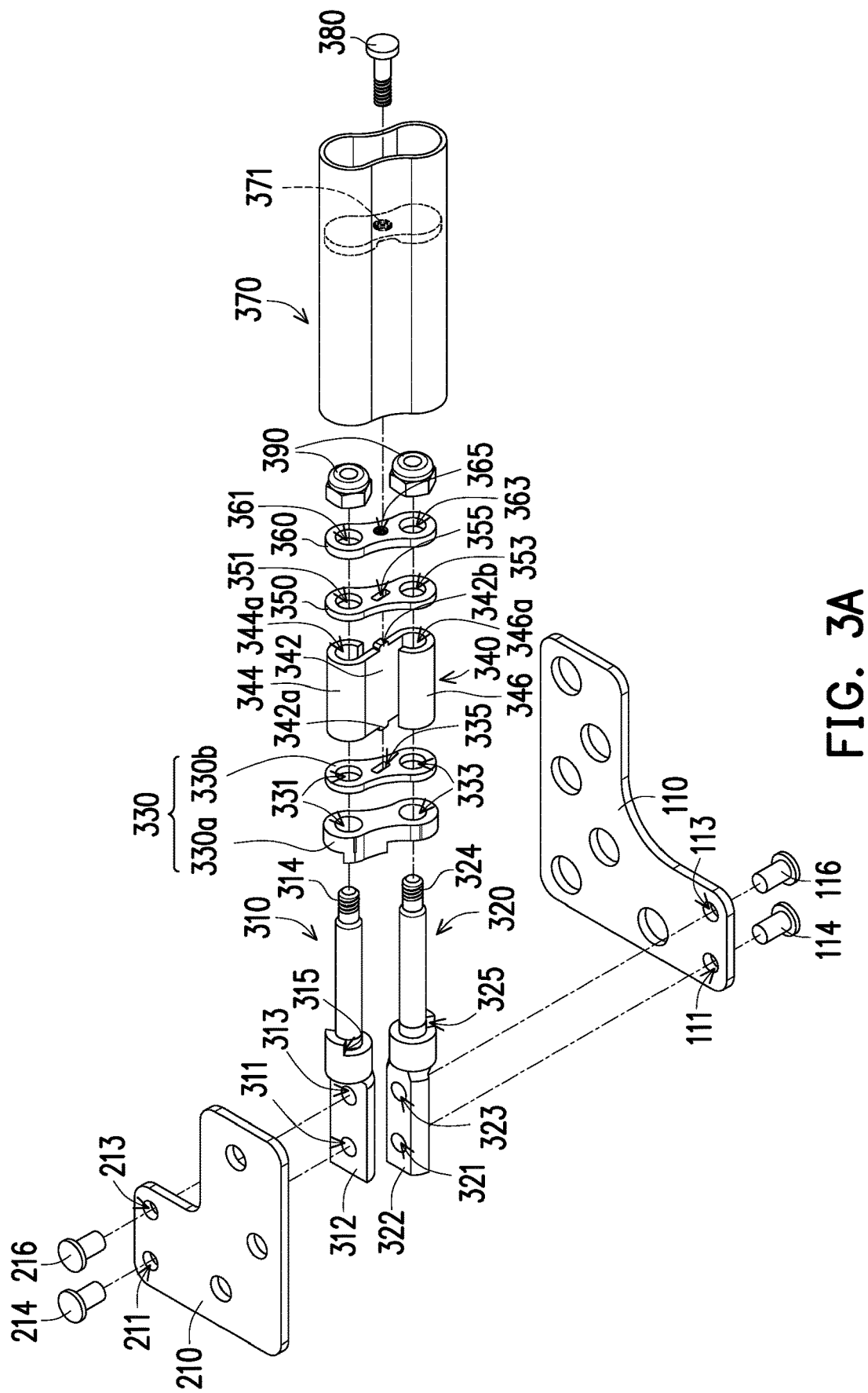
FIG. 3A is an exploded view of components of the dual-shaft hinge.
Figure 3B:
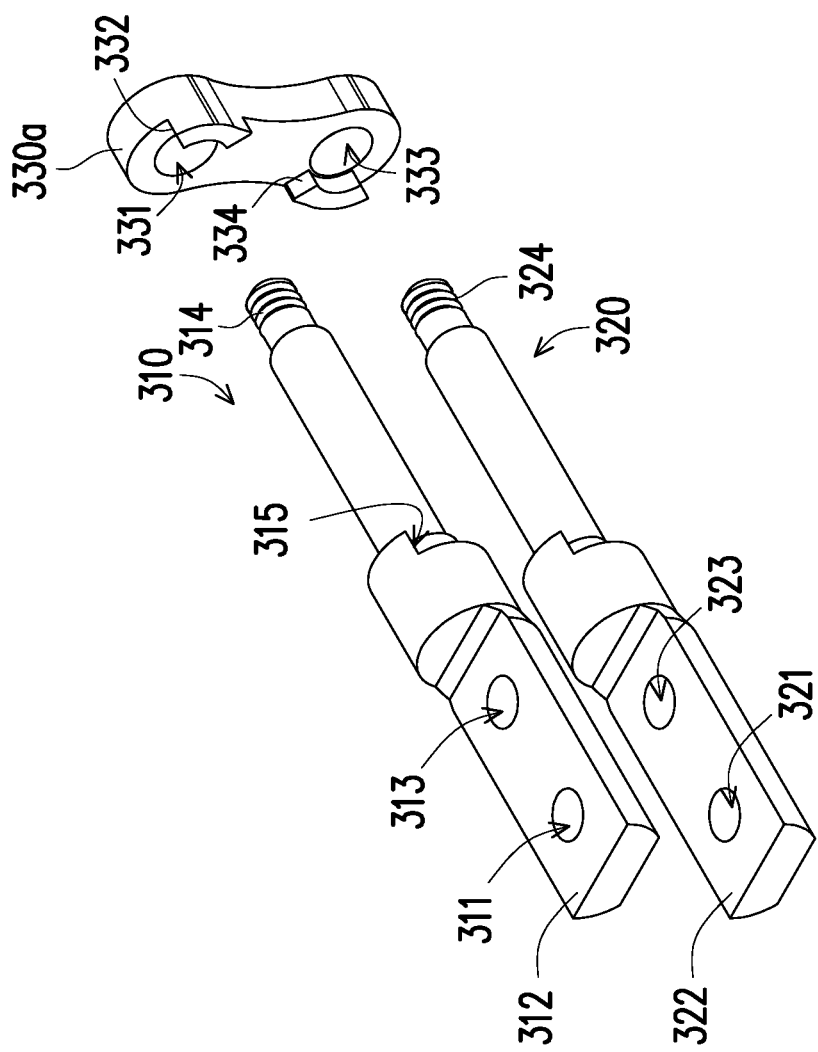
FIG. 3B is a schematic view of part of the components of the dual-shaft hinge of FIG. 3A.

FIG. 1 is a schematic view of a portable electronic device having a dual-shaft hinge according to a first embodiment of the invention. FIG. 2 is a schematic enlarged view of the dual-shaft hinge (excluding a housing and a screwing member). FIG. 3A is an exploded view of components of the dual-shaft hinge. FIG. 3B is a schematic view of part of the components of the dual-shaft hinge of FIG. 3A. In FIG. 2, the housing and the screwing member are omitted so as to allow the internal components of the dual-shaft hinge to be easily viewed.

With reference to FIG. 1 to FIG. 3B, a portable electronic device 10 of this embodiment includes an upper cover 100, a main body 200, and a dual-shaft hinge 300. In this embodiment, the portable electronic device 10 is, for example, a notebook computer. The upper cover 100 is, for example, a display or a touch screen. The main body 200 has a keyboard module or a touch panel operating region. The upper cover 100 of the electronic device 10 is pivotedly connected to the main body 200 through the dual-shaft hinge 300.

As shown in FIG. 3A, the dual-shaft hinge 300 includes a first rotating shaft 310, a second rotating shaft 320, a fixing assembly 330, a torque element 340, and a first carrier plate 350. In this embodiment, a first opening hole 311 and a second opening hole 313 are disposed on a first end portion 312 of the first rotating shaft 310, and a third opening hole 321 and a fourth opening hole 323 are disposed on a first end portion 322 of the second rotating shaft 320. A first screwing plate 210 has a first opening hole 211 and a second opening hole 213, and a first fixing member 214 penetrates the first opening hole 211 on the first screwing plate 210 and thus is fixed to the first opening hole 311 on the first rotating shaft 310. A second fixing member 216 penetrates the second opening hole 213 on the first screwing plate 210 and thus is fixed to the second opening hole 313 on the first rotating shaft 310. A second screwing plate 110 has a third opening hole 111 and a fourth opening hole 113, and a third fixing member 114 penetrates the third opening hole 111 on the second screwing plate 110 and is thus fixed to the third opening hole 321 on the second rotating shaft 320. A fourth fixing member 116 penetrates the fourth opening hole 113 on the second screwing plate 110 and is thus fixed to the fourth opening hole 323 on the second rotating shaft 320. The first fixing member 214, the second fixing member 216, the third fixing member 114, and the fourth fixing member 116 are, for example, rivets or screws and provide a fixing effect when being riveted to or screwed to the screwing holes, but the invention is not limited thereto. In this embodiment, the first screwing plate 210 is connected to the main body 200, and the second screwing plate 110 is connected to the upper cover 100, so that the dual-shaft hinge 300 may be connected between the upper cover 100 and the main body 200 through the first screwing plate 210 and the second screwing plate 110. As such, the upper cover 100 and the main body 200 may rotate to be unfolded and folded relative to each other through a torque force provided by the dual-shaft hinge 300. In an embodiment that is not shown, it may be the second screwing plate to be connected to the main body and the first screwing plate to be connected to the upper cover.

The fixing assembly 330 has first vias 331, second vias 333, and a first locating hole 335 located between one of the first vias 331 and one of the second vias 333. The first rotating shaft 310 is inserted in the first vias 331, and the second rotating shaft 320 is inserted in the second vias 333. In this embodiment, the fixing assembly 330 includes a fixing base 330a and a second carrier plate 330b. The fixing base 330a and the torque element 340 are located at two opposite sides of the second carrier plate 330b. The first vias 331 and the second vias 333 are formed on both the fixing base 330a and the second carrier plate 330b. The first locating hole 335 is formed on the second carrier plate 330b. Unlike the fixing assembly described above, a fixing assembly in an embodiment that is not shown may be a component formed by combining the fixing base and the second carrier plate together, and such fixing assembly includes a first via, a second via, and a first locating hole located between the first via and the second via.

The torque element 340 has a connection portion 342, a first torque providing portion 344 and a second torque providing portion 346 extending from two opposite sides of the connection portion 342, and a first positioning protruding portion 342a and a second positioning protruding portion 342b extending from the other two opposite sides of the connection portion 342. The first torque providing portion 344 has a first hole groove 344a, and the first rotating shaft 310 is inserted in the first hole groove 344a. The second torque providing portion 346 has a second hole groove 346a, and the second rotating shaft 320 is inserted in the second hole groove 346a. The first positioning protruding portion 342a is inserted in the first locating hole 335. The first torque providing portion 344, the second torque providing portion 346, and the connection portion 342 may be an integrally-formed component. Alternatively, the first torque providing portion 344 and the second torque providing portion 346 may be separately manufactured and formed before being bonded to the connection portion 342. In this embodiment, the first torque providing portion 344 and the second torque providing portion 346 are curved in opposite directions respectively from an upper end and a lower end of the connection portion 342. That is to say, the first torque providing portion 344 and the second torque providing portion 346 are curved in a same clockwise direction or a same counterclockwise direction respectively from the upper end and the lower end of the connection portion 342, so that the torque element 340 may be S-shaped or reverse S-shaped from a side view. In other words, in this embodiment, the first torque providing portion 344 and the second torque providing portion 346 act as a first sleeve and a second sleeve extending from two opposite sides of the connection portion 342. The first sleeve surrounds and forms the first hole groove 344a, and the second sleeve surrounds and forms the second hole groove 346a.

The first carrier plate 350 and the fixing assembly 330 are located at two opposite sides (a left side and a right side) of the torque element 340. The first carrier Plate 350 has a first through hole 351, a second through hole 353, and a second locating hole 355. The first rotating shaft 310 is inserted in the first through hole 351, the second rotating shaft 320 is inserted in the second through hole 353, and the second positioning protruding portion 342b is inserted in the second locating hole 355.

In short, the first rotating shaft 310 penetrates the first vias 331 of the fixing assembly 330, the first hole groove 344a of the torque element 340, and the first through hole 351 of the first carrier plate 350 in sequence, and the second rotating shaft 320 penetrates the second vias 333 of the fixing assembly 330, the second hole groove 346a of the torque element 340, and the second through hole 353 of the first carrier plate 350 in sequence. When the upper cover 100 and the main body 200 rotates with respect to each other to be unfolded and folded through the dual-shaft hinge 300, since the first positioning protruding portion 342a on the torque element 340 is inserted in the first locating hole 335 of the fixing assembly 330 and the second positioning protruding portion 342b on the torque element 340 is inserted in the second locating hole 355 of the first carrier plate 350, a torque force generated by the first torque providing portion of the torque element and applied to the first rotating shaft and a torque force generated by the second torque providing portion of the torque element and applied to the second rotating shaft are less susceptible to be affected by each other.

In addition, with reference to FIG. 3B, in this embodiment, the first rotating shaft 310 includes a first stopping surface 315, and the second rotating shaft 320 includes a second stopping surface 325 (shown in FIG. 3A). The fixing base 330a includes a first stopping portion 332 and a second stopping portion 334 respectively corresponding to the first stopping surface 315 and the second stopping surface 325. The second stopping portion 334 is disposed in a position diagonal to the first stopping portion 332. When the upper cover 100 and the main body 200 rotates with respect to each other, the first stopping portion 332 and the second stopping portion 334 are configured to control rotation sequence and rotational angles of the first rotating shaft 310 and the second rotating shaft 320.

In this embodiment, the dual-shaft hinge 300 further includes a fixing plate 360, a housing 370, and a screwing member 380. The torque element 340 and the fixing plate 360 are located at two opposite sides of the first carrier plate 350. The fixing plate 360 has a third via 361, a fourth via 363, and a screwing hole 365. The first rotating shaft 310 inserted in the third via 361, and the second rotating shaft 320 inserted in the fourth via 363. Besides, two nuts 390 are separately screwed to a second end portion 314 of the first rotating shaft 310 and a second end portion 324 of the second rotating shaft 320. In this way, elements of the dual-shaft hinge 300 are prevented from being detached from the first rotating shaft 310 and the second rotating shaft 320 as affected by a force generated during rotation. The housing 370 covers outer portions of the first rotating shaft 310, the second rotating shaft 320, the fixing assembly 330, the torque element 340, the first carrier plate 350, the fixing plate 360, and the two nuts 390. The screwing member 380 is inserted in a screwing hole 371 on the housing 370 to be screwed in the screwing hole 365 of the fixing plate 360. The dual-shaft hinge 300 may feature a favorable appearance through the design of the housing 370. Further, each of the elements of the dual-shaft hinge 300 is protected by the housing 370 from being damaged when being applied by an external force.

Figure 4A:
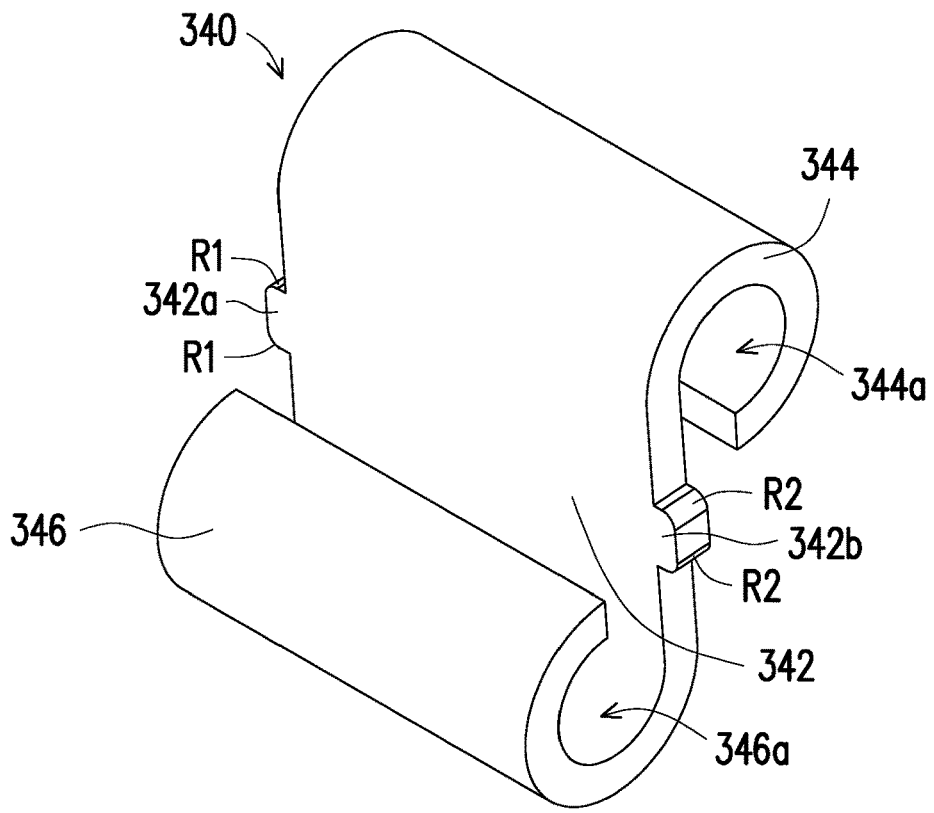
FIG. 4A is a schematic three-dimensional view of the torque element.
Figure 4B:
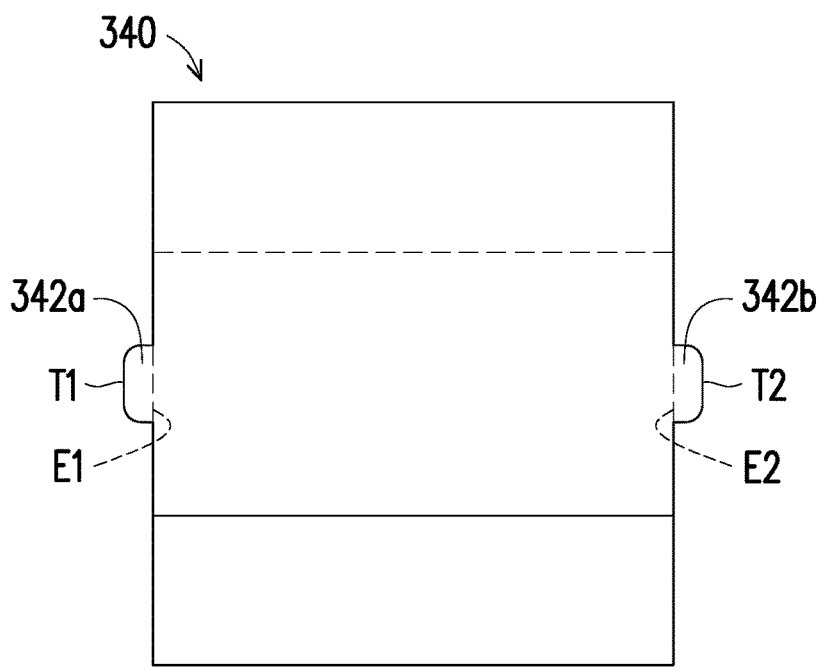
FIG. 4B is a schematic front view of the torque element of FIG. 4A.

FIG. 4A is a schematic three-dimensional view of the torque element. FIG. 4B is a schematic front view of the torque element of FIG. 4A. With reference to FIG. 4A and FIG. 4B, in order to allow the first positioning protruding portion 342a to be easily assembled to the first locating hole 335 and the second positioning protruding portion 342b to be easily assembled to the second locating hole 355, a length of a first bottom end E1 connected to the connection portion 342 is greater than a length of a first top end T1 away from the connection portion 342 in the first positioning protruding portion 342a, and a length of a second bottom end E2 connected to the connection portion 342 is greater than a length of a second top end T2 away from the connection portion 342 in the second positioning protruding portion 342b. For instance, in this embodiment, the first top end T1 of the first positioning protruding portion 342a and the second top end T2 of the second positioning protruding portion 342b respectively include first arc lead angles R1 and second arc lead angles R2; nevertheless, shapes of the first positioning protruding portion 342a and the second positioning protruding portion 342b are not limited in this regard. In other embodiments, the length of the first bottom end E1 connected to the connection portion 342 may be equal to the length of the first top end T1 away from the connection portion 342 in the first positioning protruding portion 342a, and the length of the second bottom end E2 connected to the connection portion 342 may be equal to the length of the second top end T2 away from the connection portion 342 in the second positioning protruding portion 342b.

Figure 5A:
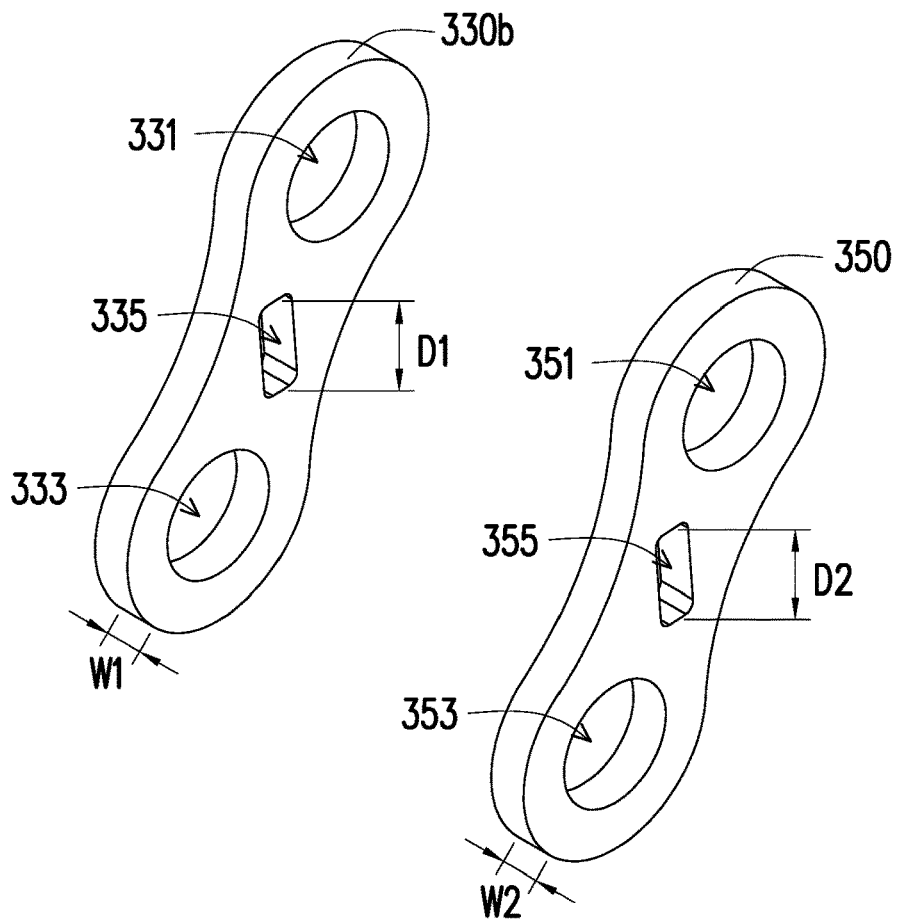
FIG. 5A is a schematic three-dimensional view of the carrier plates.
Figure 5B:
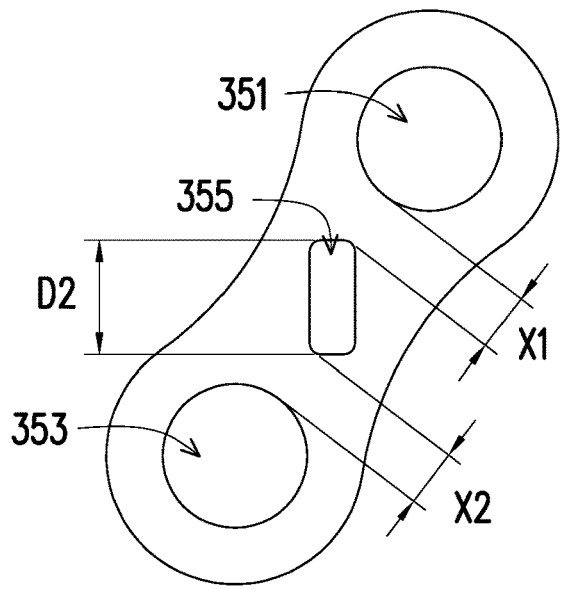
FIG. 5B is a schematic side view of the first carrier plate of FIG. 5A.

The S-shaped torque element 340, the fixing assembly 330, and the first carrier plate 350 are bonded together. In this way, when the upper cover 100 rotates with respect to the main body 200, part of a reaction force generated by rotation of the first rotating shaft 310 and the second rotating shaft 320 and applied to the first torque providing portion 344 and the second torque providing portion 346 is transferred onto the second carrier plate 330b through the first positioning protruding portion 342a and transferred onto the first carrier plate 350 through the second positioning protruding portion 342b. Therefore, in this embodiment, the first carrier plate 350 or the second carrier plate 330b may be less susceptible to be broken or damaged through the design of sizes of the first carrier plate 350 and the second carrier plate 330b. FIG. 5A is a schematic three-dimensional view of the carrier plates. FIG. 5B is a schematic side view of the first carrier plate of FIG. 5A. With reference to FIG. 5A and FIG. 5B, the second carrier plate 330b and the first carrier plate 350 respectively have a first thickness W1 and a second thickness W2. A minimum distance X1 between the first through hole 351 and the second locating hole 355 on the first carrier plate 350 is 1 to 3 times greater than the second thickness W2 of the first carrier plate 350, and a minimum distance X2 between the second through hole 353 and the second locating hole 355 is 1 to 3 times greater than the second thickness W2 of the first carrier plate 350. Stiffness required by the second carrier plate 330b and the first carrier plate 350 may be achieved through the proportional relationship designed between the minimum distance X1 and the second thickness W2 and the proportional relationship designed between the minimum distance X2 and the second thickness W2.

Figure 6A:
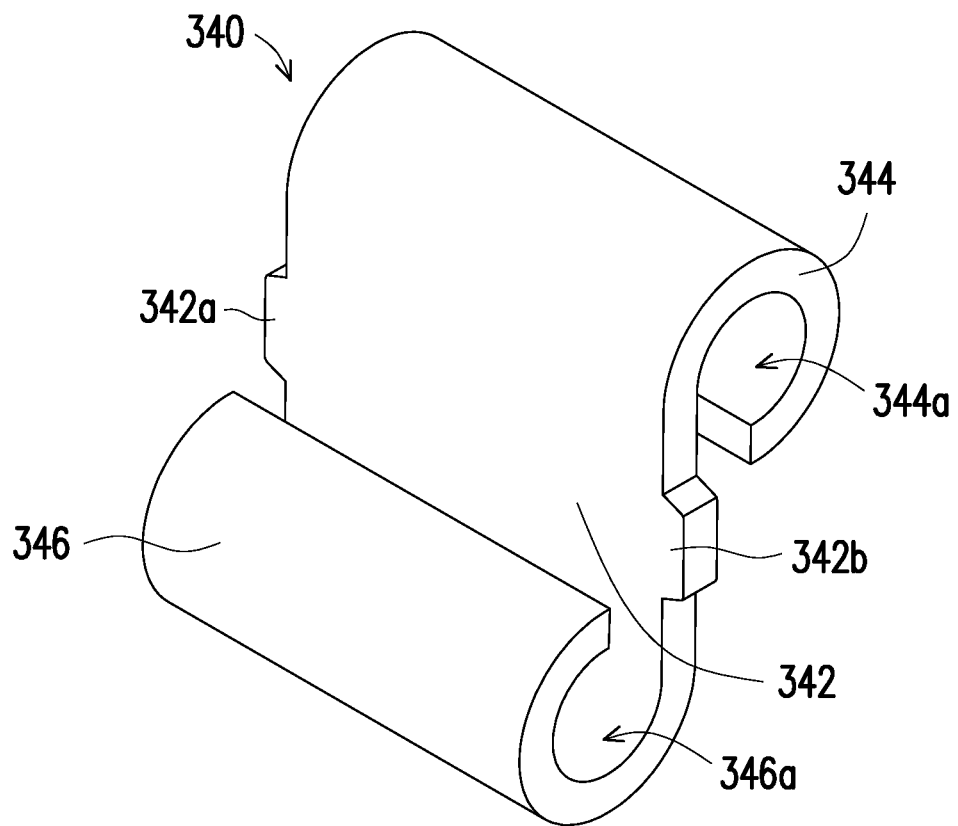
FIG. 6A is a schematic three-dimensional view of the torque element according to a second embodiment.
Figure 6B:
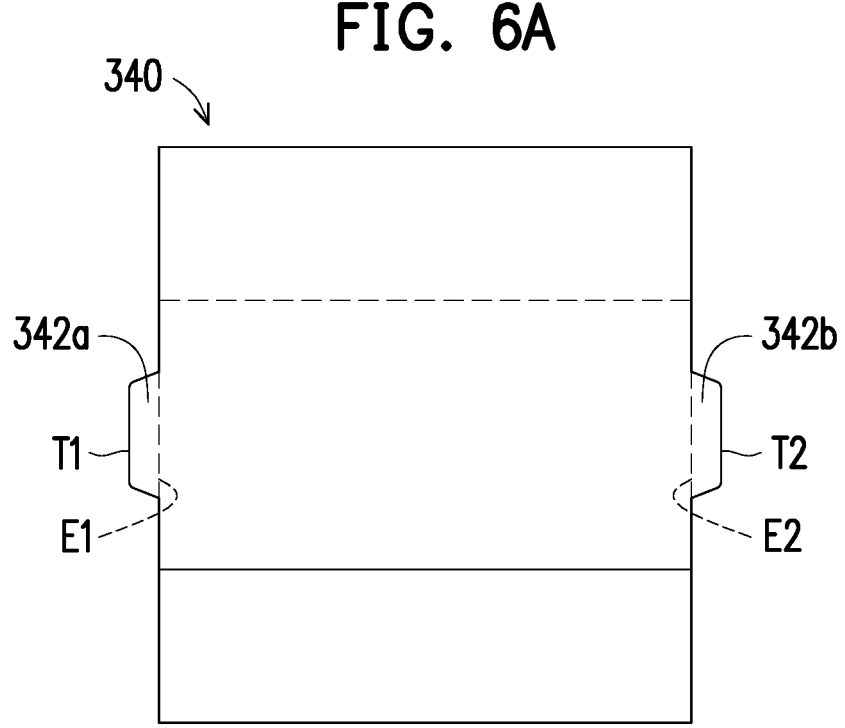
FIG. 6B is a schematic front view of the torque element of FIG. 6A.
Figure 6C:
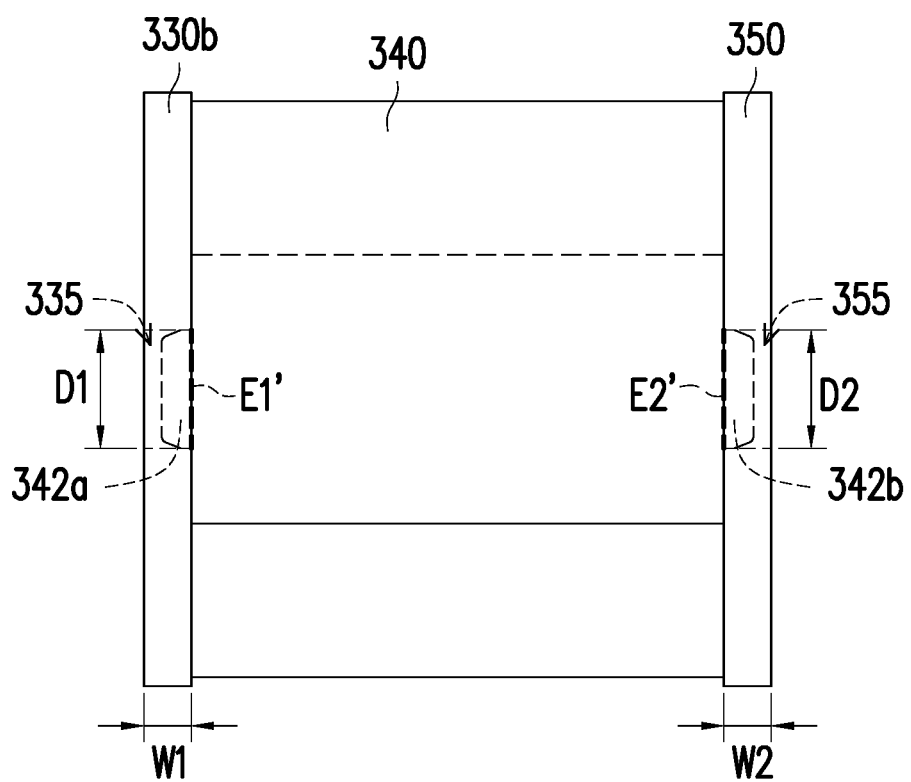
FIG. 6C is a schematic front view of the torque element and the carrier plates.

FIG. 6A is a schematic three-dimensional view of the torque element according to a second embodiment. FIG. 6B is a schematic front view of the torque element of FIG. 6A. FIG. 6C is a schematic front view of the torque element and the carrier plates. With reference to FIG. 6A to FIG. 6C, a difference between the embodiment of FIG. 6A to FIG. 6C and the embodiment of FIG. 4B is that the first positioning protruding portion 342a and the second positioning protruding portion 342b are trapezoidal-shaped cylinder structures in the embodiment of FIG. 6A to FIG. 6C. Nevertheless, the shapes of the first positioning protruding portion 342a and the second positioning protruding portion 342b are not limited by the invention, as long as the length of the first bottom end E1 connected to the connection portion 342 is greater than the length of the first top end T1 away from the connection portion 342 in the first positioning protruding portion 342a and the length of the second bottom end E2 connected to the connection portion 342 is greater than the length of the second top end T2 away from the connection portion 342 in the second positioning protruding portion 342b.

In addition, with reference to FIG. 5A, FIG. 6B, and FIG. 6C, a hole length D1 of the first locating hole 335 is less than the length of the first bottom end E1 of the first positioning protruding portion 342a and is greater than the length of the first top end T1, and a hole length D2 of the second locating hole 355 is less than the length of the second bottom end E2 of the second positioning protruding portion 342b and is greater than the length of the second top end T2. In this embodiment, when the first positioning protruding portion 342a is inserted in the first locating hole 335, the first bottom end E1 is limited by the hole length D1 of the first locating hole 335 and thus is compressed and deformed, and in this way, the first bottom end E1 securely fits the hold length D1 of the first locating hole 335. A length of a deformed first bottom end E1' is equal to the hole length D1 of the first locating hole 335. Similarly, when the second positioning protruding portion 342b is inserted in the second locating hole 355, the second bottom end E2 is limited by the hole length D2 of the second locating hole 355 and thus is compressed and deformed, and in this way, the second bottom end E2 securely fits the hole length D2 of the second locating hole 355. A length of a deformed second bottom end E2' is equal to the hole length D2 of the second locating hole 355. As the bottom ends are designed to securely fit the hole lengths of the locating holes, when the torque element 340 rotates, the first positioning protruding portion 342a and the second positioning protruding portion 342b are prevented from being respectively detached from the first locating hole 335 and the second locating hole 355. The first locating hole 335 and the second locating hole 355 are not limited in this regard, as long as the torque element 340 is designed to be fixed to the first locating hole 335 and the second locating hole 355 respectively through the first positioning protruding portion 342a and the second positioning protruding portion 342b, such design may fall within the scope that the invention is seeking to protect.

Figure 7A:
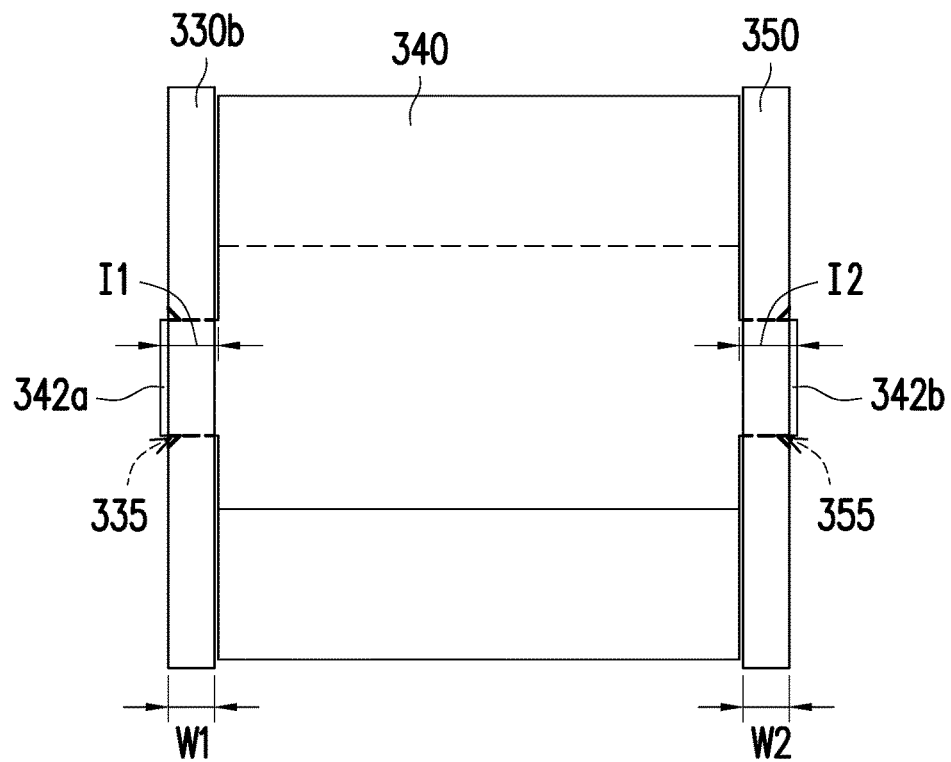
FIG. 7A is a schematic front view of the torque element and the carrier plates before being processed.
Figure 7B:
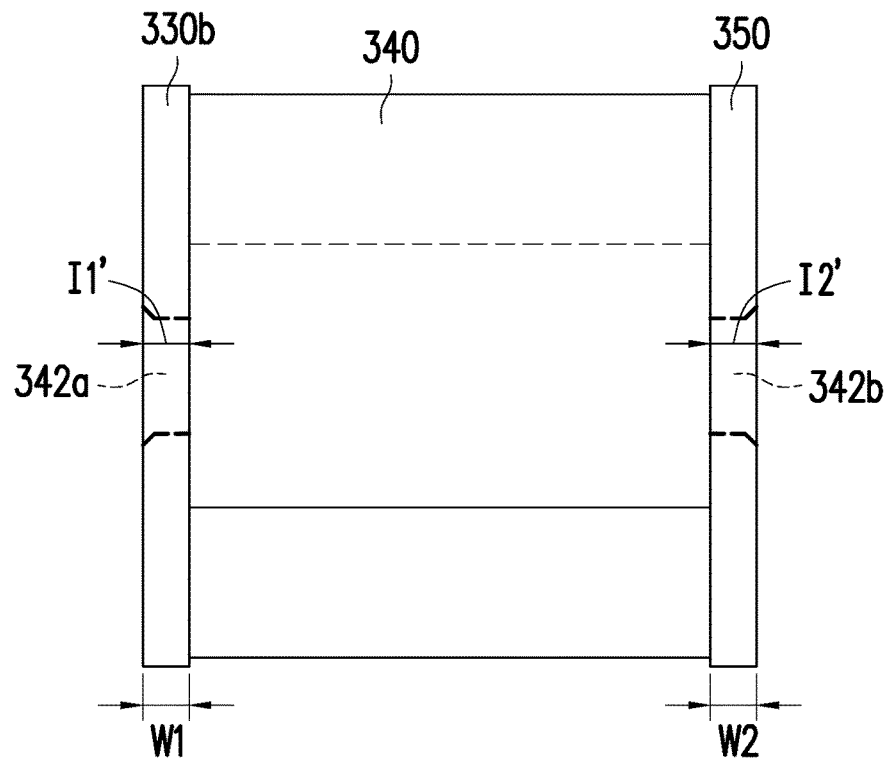
FIG. 7B is a schematic front view of the torque element and the carrier plates of FIG. 7A after being processed.

FIG. 7A is a schematic front view of the torque element and the carrier plates before being processed. FIG. 7B is a schematic front view of the torque element and the carrier plates of FIG. 7A after being processed. With reference to FIG. 7A and FIG. 7B, portions of the first locating hole 335 and the second locating hole 355 away from the torque element 340 gradually expand. Specifically, the first locating hole 335 and the second locating hole 355 on the first carrier plate 350 and the second carrier plate 330b away from side surfaces of the torque element 340 have lead angles (e.g., C angles), but shapes of the lead angles are not limited in this regard. Hence, lengths of the holes away from the torque element 340 are greater than lengths of the holes close to the torque element 340. In an embodiment that is not shown, in addition to that the portions of the first locating hole and the second locating hole away from the torque element gradually expand, portions of the first locating hole and the second locating hole close to the torque element may gradually expand as well.

With reference to FIG. 6B and FIG. 7A, in this embodiment, before being processed, the first positioning protruding portion 342a protrudes from the first locating hole 335, and the first positioning protruding portion 342a has a first length I1 extending from the first bottom end E1 to the first top end T1. When the first positioning protruding portion 342a is inserted in the first locating hole 335, the first length I1 is 1.1 to 2 times greater than the first thickness W1. The second positioning protruding portion 342b protrudes from the second locating hole 355, and the second positioning protruding portion 342b has a second length I2 extending from the second bottom end E2 to the second top end T2. When the second positioning protruding portion 342b is inserted in the second locating hole 355, the second length I2 is 1.1 to 2 times greater than the second thickness W2.

With reference to FIG. 7B, after the first positioning protruding portion 342a is inserted in the first locating hole 335 of the first carrier plate 350 and the second positioning protruding portion 342b is inserted in the second locating hole 355 of the second carrier plate 330b, a compression force is applied to the first positioning protruding portion 342a and the second positioning protruding portion 342b (e.g., riveting processing). After such processing is completed, a material (with reference to FIG. 7A) of a portion of the first positioning protruding portion 342a protruding from the first locating hole 335 fills up a space of the expanding portion of the first locating hole 335. At this time, a length of the first positioning protruding portion 342a is equal to the first length I1'. Further, a material (with reference to FIG. 7A) of a portion of the second positioning protruding portion 342b protruding from the second locating hole 355 fills up a space of the expanding portion of the second locating hole 355. A length of the second positioning protruding portion 342b is equal to the second length I2'. It thus can be seen that the processed first length I1' is equal to the first thickness W1, and the processed second length I2' is equal to the second thickness W2.

In view of the foregoing, in the dual-shaft hinge of the electronic device provided by the invention, the cover may rotate with respect to the main body at any angle from 0 degree to 360 degrees. The first positioning protruding portion and the second positioning protruding portion located between the first torque providing portion and the second torque providing portion of the torque element are fixed by the fixing assembly and the first carrier plate. In this way, in the torque element, the torque force generated by the first torque providing portion and applied to the first rotating shaft and the torque force generated by the second torque providing portion and applied to the second rotating shaft are less susceptible to be affected by each other. In an embodiment, in order to allow the first positioning protruding portion and the second positioning protruding portion to be easily assembled onto the fixing assembly and the first carrier plate, the first positioning protruding portion and the second positioning protruding portion may include lead angles or may be trapezoidal-shaped. In an embodiment, in order to allow the first positioning protruding portion and the second positioning protruding portion to securely fit the fixing assembly and the first carrier plate, the lengths of the bottom ends of the first positioning protruding portion and the second positioning protruding portion adjacent to the connection portion are greater than the lengths of the locating holes on the fixing assembly and the first carrier plate.

Further, portions of the first locating hole and the second locating hole may gradually expand, and in this way, the first positioning protruding portion and the second positioning protruding portion may be riveted, so that a favorable fixing effect is provided.

Finally, it is worth noting that the foregoing embodiments are merely described to illustrate the technical means of the invention and should not be construed as limitations of the invention. Even though the foregoing embodiments are referenced to provide detailed description of the invention, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the invention.

What is claimed is:

1. A dual-shaft hinge, comprising:
    a first rotating shaft;
    a second rotating shaft;
    a fixing assembly, having a first via, a second via, and a first locating hole located between the first via and the second via, the first rotating shaft inserted in the first via, the second rotating shaft inserted in the second via;
    a torque element, having a connection portion, a first torque providing portion and a second torque providing portion extending from two opposite sides of the connection portion, a first positioning protruding portion and a second positioning protruding portion extending from other two opposite sides of the connection portion, the first torque providing portion having a first hole groove, the first rotating shaft inserted in the first hole groove, the second torque providing portion having a second hole groove, the second rotating shaft inserted in the second hole groove, the first positioning protruding portion inserted in the first locating hole; and
    a first carrier plate, the first carrier plate and the fixing assembly located at two opposite sides of the torque element, the first carrier plate having a first through hole, a second through hole, and a second locating hole, the first rotating shaft inserted in the first through hole, the second rotating shaft inserted in the second through hole, the second positioning protruding portion inserted in the second locating hole,
    wherein a minimum distance between the first through hole and the first locating hole on the first carrier plate is 1 to 3 times greater than a thickness of the first carrier plate, and a minimum distance between the second through hole and the first locating hole is 1 to 3 times greater than the thickness of the first carrier plate.

2. The dual-shaft hinge as claimed in claim 1, wherein a length of a first bottom end connected to the connection portion is greater than a length of a first top end away from the connection portion in the first positioning protruding portion, and a length of a second bottom end connected to the connection portion is greater than a length of a second top end away from the connection portion in the second positioning protruding portion.

3. The dual-shaft hinge as claimed in claim 1, wherein a first top end of the first positioning protruding portion away from the connection portion and a second top end of the second positioning protruding portion away from the connection portion both have arc lead angles.

4. The dual-shaft hinge as claimed in claim 2, wherein the first positioning protruding portion and the second positioning protruding portion are trapezoidal-shaped cylinder structures.

5. The dual-shaft hinge as claimed in claim 2, wherein a hole length of the first locating hole is less than the length of the first bottom end and is greater than the length of the first top end of the first positioning protruding portion, and a hole length of the second locating hole is less than the length of the second bottom end and is greater than the length of the second top end of the second positioning protruding portion.

6. The dual-shaft hinge as claimed in claim 1, wherein portions of the first locating hole and the second locating hole away from the torque element gradually expand.

7. The dual-shaft hinge as claimed in claim 1, wherein the fixing assembly comprises a fixing base and a second carrier plate, the fixing base and the torque element are located at two opposite sides of the second carrier plate, the first via and the second via are formed on both the fixing base and the second carrier plate, and the first locating hole is formed on the second carrier plate.

8. The dual-shaft hinge as claimed in claim 7, wherein the first rotating shaft comprises a first stopping surface, the second rotating shaft comprises a second stopping surface, and the fixing base comprises a first stopping portion and a second stopping portion respectively corresponding to the first stopping surface and the second stopping surface.

9. The dual-shaft hinge as claimed in claim 1, wherein the dual-shaft hinge further comprises a fixing plate, a housing, and a screwing member, the torque element and the fixing plate are located at two opposite sides of the first carrier plate, the fixing plate has a third via, a fourth via, and a screwing hole, the first rotating shaft is inserted in the third via, the second rotating shaft is inserted in the fourth via, the housing covers the first rotating shaft, the second rotating shaft, the fixing assembly, the torque element, the first carrier plate, and the fixing plate, and the screwing member is inserted in the housing and is screwed to the screwing hole of the fixing plate.

10. The dual-shaft hinge as claimed in claim 1, wherein the first torque providing portion and the second torque providing portion act as a first sleeve and a second sleeve extending from two opposite sides of the connection portion, the first sleeve surrounds and forms the first hole groove, and the second sleeve surrounds and forms the second hole groove.

11. An electronic device, wherein the electronic device comprises:
    an upper cover;
    a main body; and
    a dual-shaft hinge, the upper cover and the main body connected to the dual-shaft hinge, the upper cover pivotedly connected to the main body through the dual-shaft hinge, the dual-shaft hinge comprising:
    a first rotating shaft;
    a second rotating shaft;
    a fixing assembly, having first via, second via, and a first locating hole located between the first via and the second via, the first rotating shaft inserted in the first via, the second rotating shaft inserted in the second via;
    a torque element, having a connection portion, a first torque providing portion and a second torque providing portion extending from two opposite sides of the connection portion, a first positioning protruding portion and a second positioning protruding portion extending from other two opposite sides of the connection portion, the first torque providing portion having a first hole groove, the first rotating shaft inserted in the first hole groove, the second torque providing portion having a second hole groove, the second rotating shaft inserted in the second hole groove, the first positioning protruding portion inserted in the first locating hole; and a first carrier plate, the first carrier plate and the fixing assembly located at two opposite sides of the torque element, the first carrier plate having a first through hole, a second through hole, and a second locating hole, the first rotating shaft inserted in the first through hole, the second rotating shaft inserted in the second through hole, the second positioning protruding portion inserted in the second locating hole, wherein a minimum distance between the first through hole and the second locating hole on the first carrier plate is 1 to 3 times greater than a thickness of the first carrier plate, and a minimum distance between the second through hole and the second locating hole is 1 to 3 times greater than the thickness of the first carrier plate.

12. The electronic device as claimed in claim 11, wherein a length of a first bottom end connected to the connection portion is greater than a length of a first top end away from the connection portion in the first positioning protruding portion, and a length of a second bottom end connected to the connection portion is greater than a length of a second top end away from the connection portion in the second positioning protruding portion.

13. The electronic device as claimed in claim 11, wherein a first top end of the first positioning protruding portion away from the connection portion and a second top end of the second positioning protruding portion away from the connection portion both have arc lead angles.

14. The electronic device as claimed in claim 12, wherein the first positioning protruding portion and the second positioning protruding portion are trapezoidal-shaped cylinder structures.

15. The electronic device as claimed in claim 12, wherein a hole length of the first locating hole is less than the length of the first bottom end and is greater than the length of the first top end of the first positioning protruding portion, and a hole length of the second locating hole is less than the length of the second bottom end and is greater than the length of the second top end of the second positioning protruding portion.

16. The electronic device as claimed in claim 11, wherein portions of the first locating hole and the second locating hole away from the torque element gradually expand.

17. The electronic device as claimed in claim 11, wherein the fixing assembly comprises a fixing base and a second carrier plate, the fixing base and the torque element are located at two opposite sides of the second carrier plate, the first via and the second via are formed on both the fixing base and the second carrier plate, and the first locating hole is formed on the second carrier plate.

18. The electronic device as claimed in claim 17, wherein the first rotating shaft comprises a first stopping surface, the second rotating shaft comprises a second stopping surface, and the fixing base comprises a first stopping portion and a second stopping portion respectively corresponding to the first stopping surface and the second stopping surface.

19. The electronic device as claimed in claim 11, wherein the dual-shaft hinge further comprises a fixing plate, a housing, and a screwing member, the torque element and the fixing plate are located at two opposite sides of the first carrier plate, the fixing plate has a third via, a fourth via, and a screwing hole, the first rotating shaft is inserted in the third via, the second rotating shaft is inserted in the fourth via, the housing covers the first rotating shaft, the second rotating shaft, the fixing assembly, the torque element, the first carrier plate, and the fixing plate, and the screwing member is inserted in the housing and is screwed to the screwing hole of the fixing plate.

20. The electronic device as claimed in claim 11, wherein the first torque providing portion and the second torque providing portion act as a first sleeve and a second sleeve extending from two opposite sides of the connection portion, the first sleeve surrounds and forms the first hole groove, and the second sleeve surrounds and forms the second hole groove.

* * * * *